United States Patent
Lin et al.

(10) Patent No.: US 7,679,709 B2
(45) Date of Patent: Mar. 16, 2010

(54) LIQUID CRYSTAL DISPLAY PANEL AND METHOD FOR MANUFACTURING THE SAME

(75) Inventors: Fang-Ying Lin, Miao-Li (TW); Jia-Pang Pang, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 214 days.

(21) Appl. No.: 11/803,309

(22) Filed: May 14, 2007

(65) Prior Publication Data

US 2007/0263161 A1    Nov. 15, 2007

(30) Foreign Application Priority Data

May 12, 2006   (TW) .............................. 95116840 A

(51) Int. Cl.
G02F 1/1339   (2006.01)
G02F 1/13   (2006.01)

(52) U.S. Cl. .................... 349/153; 349/187; 349/190

(58) Field of Classification Search .................. 349/153
See application file for complete search history.

(56) References Cited

U.S. PATENT DOCUMENTS 6,583,847 B2   6/2003   Callegari et al.
6,830,947 B2   12/2004   Kamiya et al.
2002/0131009 A1*   9/2002   Takeuchi .................... 349/153
2003/0081155 A1*   5/2003   Moon et al. ................. 349/106

FOREIGN PATENT DOCUMENTS

CN   1815315 Y   8/2009

\* cited by examiner

*Primary Examiner*—Uyen-Chau N Le
*Assistant Examiner*—Kajli Prince
(74) *Attorney, Agent, or Firm*—Wei Te Chung

(57) ABSTRACT

A liquid crystal display panel includes a color filter, a thin film transistor substrate in opposition to the color filter, a liquid crystal layer provided between the color filter and the thin film transistor substrate and a sealant provided corresponding to the mark regions and surrounding the liquid crystal layer. The mark regions are provided on periphery of the thin film transistor substrate and each includes a plurality of alignment marks as references for applying the frame sealant and therefore controlling the applying amount and rate of the frame sealant so that the applied frame sealant has line width of desired specification and that the distance between the substrates is desirably determined. A related method for manufacturing a liquid crystal display panel is also provided.

11 Claims, 5 Drawing Sheets

LIQUID CRYSTAL DISPLAY PANEL AND METHOD FOR MANUFACTURING THE SAME

FIELD OF THE INVENTION

The present invention relates to liquid crystal display (LCD) devices and methods for manufacturing liquid crystal display devices and, more particularly, to a panel of a liquid crystal display device and a method for manufacturing the panel.

GENERAL BACKGROUND

A liquid crystal display (LCD) panel is the primary component in a LCD device. A typical process for manufacturing an LCD panel basically includes providing two glass substrates, applying sealant to the glass substrates, and injecting liquid crystal molecules into a space between the glass substrates. The manufacturing process also includes forming an array of pixel electrodes on one of the glass substrates. The pixel electrodes are for controlling rotation of the liquid crystal molecules in operation of the LCD panel. The manufacturing process further includes forming color filter films on the other glass substrate. The color filter films enable the LCD panel to display colorful images in operation.

Referring to FIG. 8, a typical LCD panel 1 includes a thin film transistor (TFT) substrate 11, a color filter (CF) substrate 13, a liquid crystal (LC) layer 15, and a frame sealant 17. The TFT substrate 11 and the CF substrate 13 are spaced apart from each other a certain distance. The LC layer 15 is filled in the space between the TFT substrate 11 and the CF substrate 13, and is surrounded and encapsulated by the frame sealant 17 between the TFT substrate 11 and the CF substrate 13.

Referring to FIG. 9, the TFT substrate 11 is formed with a plurality of first patterned conductive layers 111 and a plurality of mark regions 113. The first patterned conductive layer 111 includes a plurality of conductive wires, and faces the LC layer 15. The mark regions 113 include block-shaped conductive layers, and are located at periphery portions of the TFT substrate 11.

The LCD panel 1 is manufactured by the so-called one drop fill (ODF) method, which is implemented according to the following steps. Firstly, the frame sealant 17 is applied to a periphery of the TFT substrate 11 so as to create a semi-closed space surrounded by the frame sealant 17. Secondly, drops of liquid crystal molecules are dripped into the semi-closed space to form the LC layer 15. Thirdly, the CF substrate 13 is attached to the TFT substrate 11. The frame sealant 17 is cured in a vacuum environment so that the TFT substrate 11 and the CF substrate 13 are firmly bonded together.

Since the attachment of the CF substrate 13 to the TFT substrate 11 is achieved using the frame sealant 17, the correct distance between the CF substrate 13 and the TFT substrate 11 depends at least in part on the precision with which the frame sealant 17 is applied to the TFT substrate 11. In other words, the frame sealant 17 needs to be applied on the TFT substrate 11 with a precise line width. Thereby, a uniform distance between the CF substrate 13 and the TFT substrate 11 can be obtained. As a result, the LCD panel 1 can provide good display performance.

As detailed above, control of the line width of the frame sealant 17 in the process of assembling the LCD panel 1 is critical to the final product quality. If the line width is too thin, liquid crystal molecules are liable to leak out from the LC layer 15. This in turn is liable to cause non-uniformity of the distance between the two substrates 11, 13 of the LCD panel 1. On the other hand, if the line width is too thick, line width would bring difficulties in the afterward cutting process and therefore affect the quality of product or would cause the LC layer 15 to be polluted by the frame sealant 17 due to the position of the frame sealant 17 being too close to the display area.

In the above-described conventional technique, the frame sealant 17 is applied directly onto the mark regions 113 formed on the TFT substrate 11. The exactness of the line width of the frame sealant 17 is basically determined by the precision of the equipment used to apply the frame sealant 17. Thus, it is common for precision deviation and unevenness of line width to occur.

SUMMARY

An exemplary liquid crystal display panel according to the present invention is disclosed. The liquid crystal display panel includes a color filter substrate, a thin film transistor substrate provided in opposition to the color filter substrate, a liquid crystal layer provided between the color substrate and the thin film transistor substrate, and a frame sealant applied to a plurality of mark regions and surrounds the liquid crystal layer.

The plurality of mark regions are provided on a periphery of the thin film transistor substrate and they are adjacent to the liquid crystal layer and include a plurality of parallel aligning marks.

An exemplary method for manufacturing liquid crystal display panel according to the present invention is disclosed, and which includes the following steps.

Firstly, it is the step of providing a color filter substrate and a thin film transistor substrate provided with a plurality of mark regions on a periphery of the thin film transistor substrate. The mark regions are adjacent to the liquid crystal layer and include a plurality of parallel aligning marks. Next, it is the step of applying frame sealant to thin film transistor substrate along direction perpendicular to the aligning marks. Then, it is the step of filling liquid crystal molecules and the step of applying alignment and hot-pressing process to the color filter substrate and thin film transistor substrate. Finally, it is the step of applying seal bake process to the frame sealant.

Various embodiments of the present invention can be more fully understood by reading the subsequent detailed description and examples with reference made to the accompanying drawings. In the drawings, all the views are schematic, and at least certain of the drawings are simplified.

DETAILED DESCRIPTION OF PREFERRED EMBODIMENTS

Figure 1:
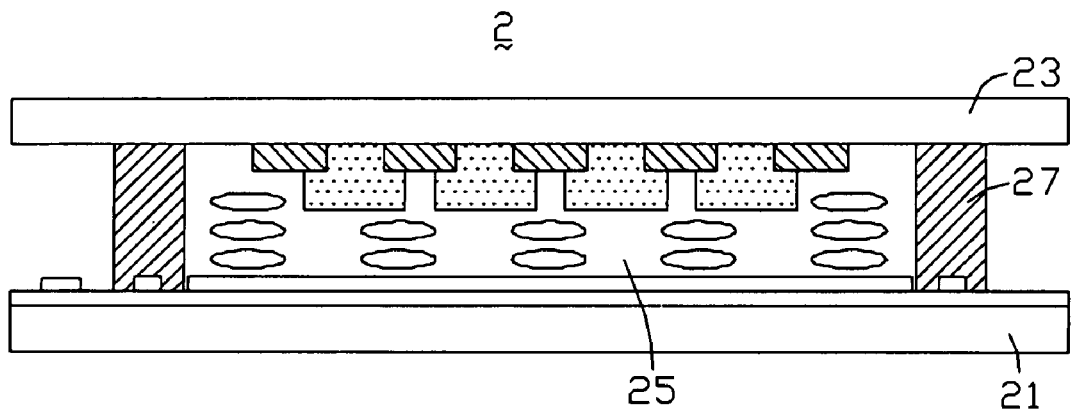
FIG. 1 is a side cross-sectional view of a liquid display panel according to a first embodiment of the present invention.

Referring to FIG. 1, a liquid crystal display panel 2 according to first embodiment of the invention includes a first substrate such as a color filter substrate 23, a second substrate such as a thin film transistor substrate 21, a liquid crystal layer 25, and a frame sealant 27. The thin film transistor substrate 21 is provided in opposition to the color filter substrate 23 and both are apart from each other a certain distance. The liquid crystal layer 25 is provided between the thin film transistor substrate 21 and the color filter substrate 23 and surrounded and encapsulated by the frame sealant 27 disposed between the thin film transistor substrate 21 and the color filter substrate 23.

The thin film transistor substrate 21 and the color filter substrate 23 are all made of glass, and the liquid crystal layer 25 is provided between the thin film transistor substrate 21 and the color filter substrate 23 as being erective or irregularly twisted so that an incident light beam is allowed to pass or is blocked. The frame sealant 27 is provided around the thin film transistor substrate 21 and the color filter substrate 23 in a manner that the liquid crystal layer 25 is well encapsulated and totally isolated from the external environment.

Figure 2:
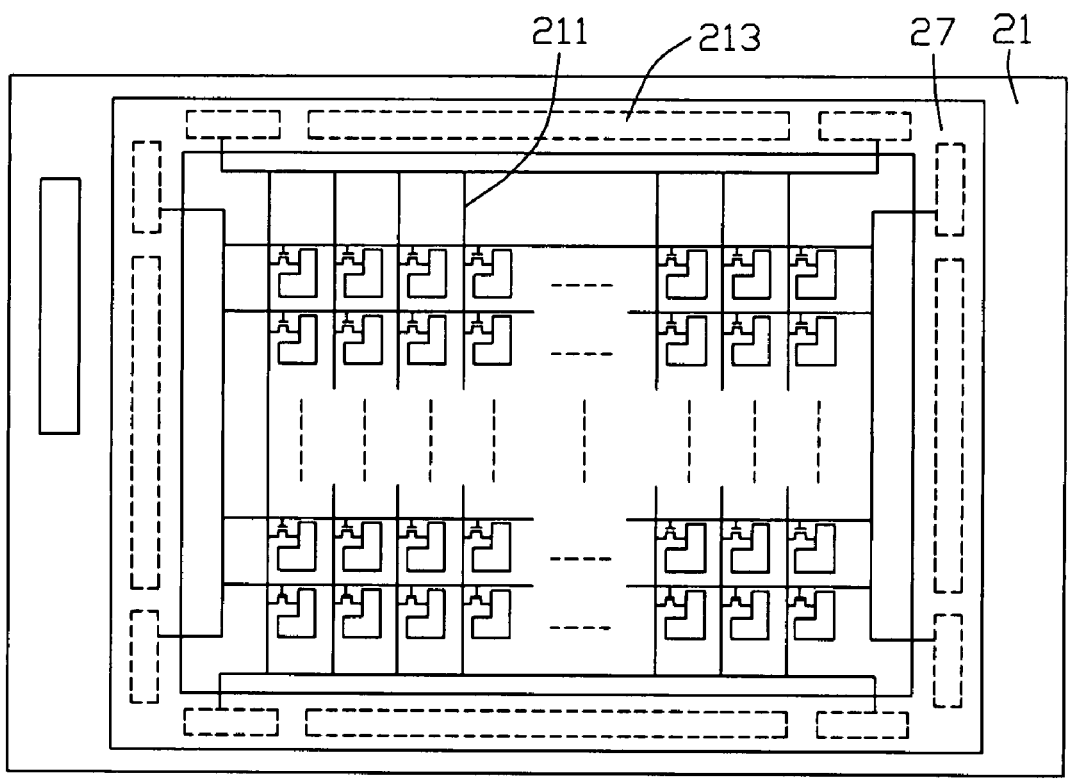
FIG. 2 is an abbreviated, top plan view of a thin film transistor substrate of the liquid crystal display panel of FIG. 1, showing a plurality of mark regions thereof.

Referring to FIG. 2, the thin film transistor substrate 21 of the liquid crystal display panel 2 is formed with a plurality of patterned conductive layers 211 on the surface and there are a plurality of mark regions 213 on the periphery for forming conductive marks that are helpful to apply the frame sealant 27. The patterned conductive layers 211 include a plurality of metallic scanning lines and signal lines across one another on the central region of the thin film transistor substrate 21 and face the liquid crystal layer 25. The conductive layers 211 allow video signals to pass and be written in a desired order into the liquid crystal display panel 2.

The mark regions 213 are provided on every side of the periphery of the thin film transistor substrate 21, corresponding to the applying areas for the frame sealant 27, and adjacent to the liquid crystal layer 25. Specifically, a plurality of conductive metallic layers are provided on each of the mark regions 213 such that the frame sealant 27 can be controllably applied via these conductive metallic layers and therefore the periphery on the thin film transistor substrate 21 is flatted and the color filter substrate 23 and the thin film transistor substrate 21 are precisely aligned.

Figure 3:
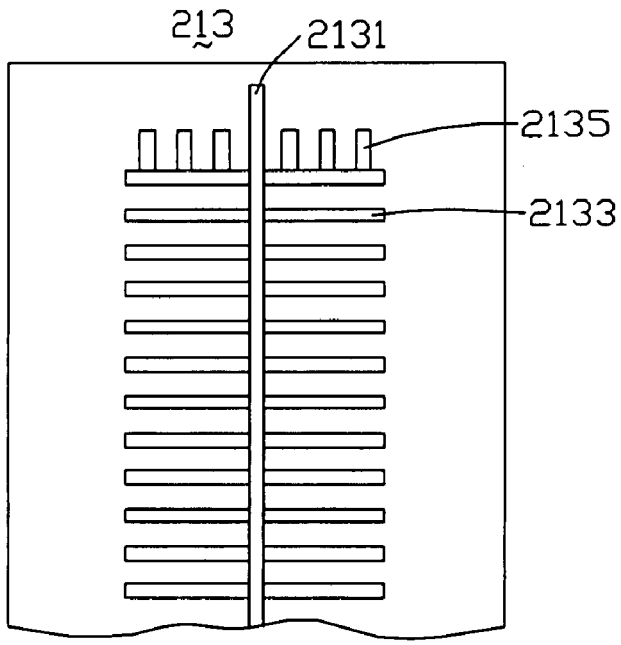
FIG. 3 is an enlarged view of part of one of the mark regions of the thin film transistor substrate of FIG. 2.

Referring to FIG. 3, an enlarged view of one of the mark regions 213 shows that the above-mentioned conductive metallic layers on each of the mark regions 213 according to one embodiment of the present invention include an aligning reference 2131, a plurality of parallel aligning marks 2133, and a plurality of aligning scales 2135.

In the preferred embodiment, the conductive metallic layers including the aligning reference 2131, the aligning marks 2133 and the aligning scales 2135 are strip-shaped. Alternatively, the aligning reference 2131 can be block-shaped. The aligning reference 2131 included in each of the mark regions 213 is provided in parallel to the edge of the thin film transistor substrate 21, while the aligning marks 2133 included in each of the mark regions 213 are provided in parallel to one another and symmetrically perpendicular to the aligning reference 2131. Each two adjacent aligning marks 2133 are spaced apart a same predetermined distance, which is in the range from 0 to 100 μm. That is, in the illustrated embodiment, the distance between any two adjacent aligning marks 2133 is equal, because all the aligning marks 2133 are part of a same unit scale. In one alternative embodiment, some of the aligning marks 2133 can belong to a first unit scale, and other of the aligning marks 2133 can belong to a second unit scale, with the second unit scale being different from the first unit scale. For example, the first unit scale may correspond to tens of micrometers, and the second unit scale may correspond to single micrometers. The aligning scales 2135 are provided along the length of one of the aligning marks 2133 and in parallel with the aligning reference 2131, with the distance between each two adjacent aligning scales 2135 being in the range from 0 to 100 μm.

The aligning reference 2131 and the aligning marks 2133 on the mark regions 213 are used as references for applying the frame sealant 27. The aligning reference 2131 can serve as the center line or the edge contour line for applying the frame sealant 27, so that the applying amount and rate of the frame sealant 27 can be controlled accordingly. In this way, the applied frame sealant 27 with line width of desired specification can be obtained and the precise alignment of the frame sealant 27 can be achieved. Otherwise, the aligning reference 2131 and the aligning marks 2133 can be served as references for modifying the application of the frame sealant 27 in real time and therefore for controlling the line width of the frame sealant 27 and the distance between the substrates to avoid line width of frame sealant 27 being unduly broad or narrow.

Figure 4:
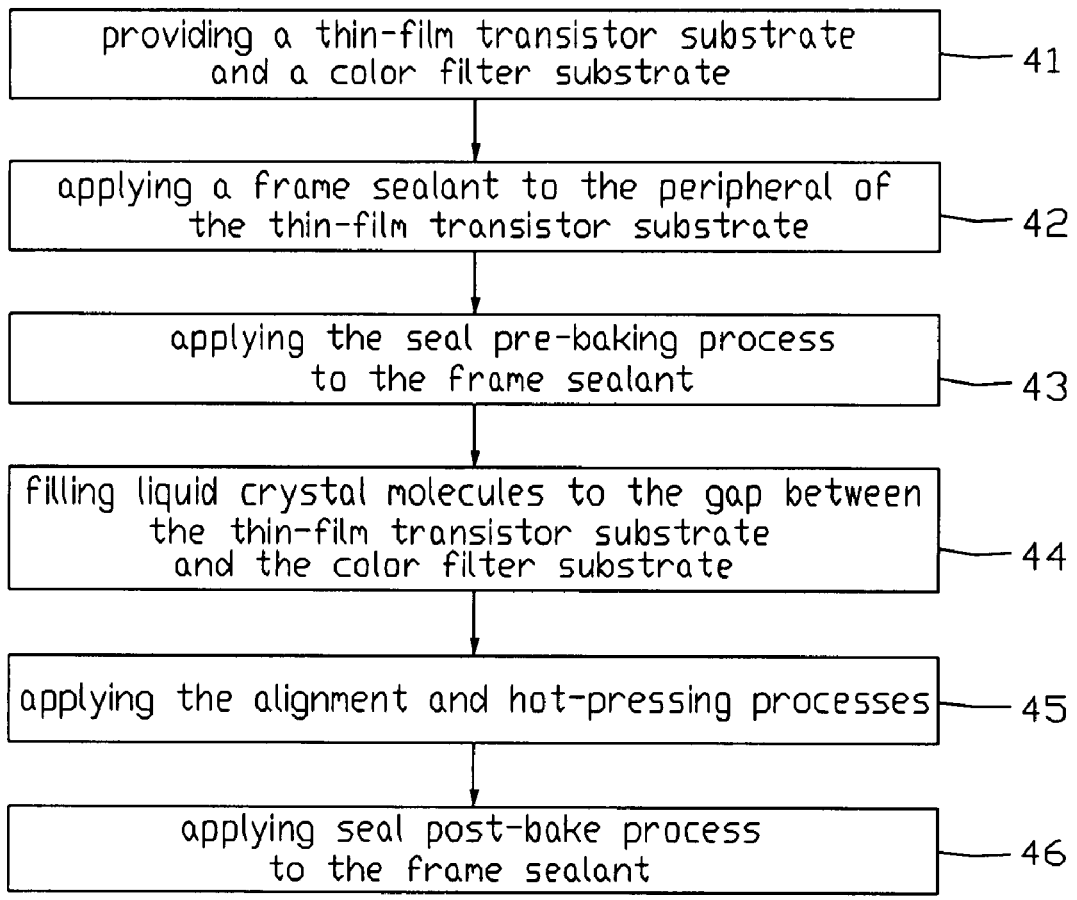
FIG. 4 is a flow chart showing a process for manufacturing the liquid crystal display panel of FIG. 1, in accordance with an exemplary embodiment of the present invention.

Referring to FIG. 4, an exemplary method for manufacturing the liquid crystal display panel 2 includes the following steps: step 41: providing a thin film transistor substrate and a color filter substrate; step 42: applying a frame sealant to a periphery of the thin film transistor substrate; step 43: applying a seal pre-baking process to the frame sealant; step 44: filling liquid crystal molecules into a space between the thin film transistor substrate and the color filter substrate; step 45: applying alignment and hot-pressing processes; and step 46: applying a seal post-bake process to the frame sealant. The method is exemplified in detail as follows:

Step 41: providing a thin film transistor substrate and a color filter substrate is exemplified by providing a thin film transistor substrate 21 and a color filter substrate 23 as shown in FIG. 1, in which the thin film transistor substrate 21 is provided on a periphery thereof with a plurality of mark regions 213 formed thereon a plurality of conductive metallic layers as shown in FIG. 2.

Step 42: applying a frame sealant to the thin film transistor substrate is exemplified by applying the frame sealant 27 to the areas corresponding to the mark regions 213 on surface of the thin film transistor substrate 21. The frame sealant 27 is applied in parallel with the aligning reference 2131 serving as the center line or the edge contour line.

Step 43: applying the seal pre-bake process to the frame sealant is exemplified by evaporating the solvent included in the frame sealant 27 and solidifying/curing the frame sealant 27 to a certain extent that the frame sealant 27 can be pressed slowly with good alignment and linear stability.

Step 44: filling liquid crystal molecules is exemplified by one-drop-filling liquid crystal molecules into the semi-closed space surrounded by the frame sealant 27 and the thin film transistor substrate 21.

Step 45: applying the aligning and hot-pressing processes is exemplified by using ultraviolet (UV) curable resin to precisely align and thereafter bond the thin film transistor substrate 21 and the color filter substrate 23 so as to prevent shift after hot-pressing. Subsequently, a hot-pressing process under two different temperatures is performed to obtain the frame sealant 27 of certain line width and certain height. Then, the pressed frame sealant 27 is used to make the thin film transistor substrate 21 and the color filter substrate 23 be apart from each other a certain distance.

Step 46: applying the seal post-bake process to the frame sealant is exemplified by allowing an external UV light beam to pass through a mask to expose the thin film transistor substrate 21 until the hot-pressed frame sealant 27 is completely solidified or cured. Thereby, the thin film transistor substrate 21 and the color filter substrate 23 are securely adhered together.

In summary, the aligning reference 2131 is provided on each of the mark regions 213, and using the aligning reference 2131 as a reference for applying the frame sealant 27. For example, the frame sealant 27 is applied along the aligning reference 2131, and the aligning marks 2133 and the aligning scales 2135 on the mark region 213 are taken as references for an operator to check the variation of the line width of the frame sealant 27 and therefore to control the applying amount and rate of the frame sealant 27 during the hot-pressing process. Thereby, the line width of the frame sealant 27 and the distance between the thin film transistor substrate 21 and the color filter substrate 23 can be desirably determined.

Further, the aligning marks 2133 and the aligning scales 2135 on the mark region 213 can be taken as references for adjusting the positioning of the applying machine as well as in cases where deviation of application of the frame sealant 27 occurs.

Figure 5:
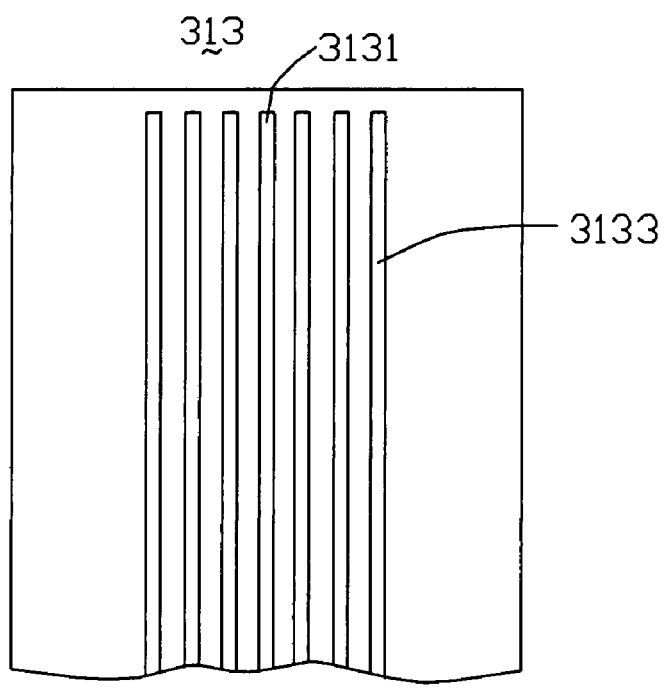
FIG. 5 is similar to FIG. 3, but showing part of one of mark regions of a thin film transistor substrate of a liquid crystal display panel according to a second embodiment of the present invention.

Referring to FIG. 5, a plan view shows the mark regions 313 according to a second embodiment of the invention, which includes an aligning reference 3131 and a plurality of aligning marks 3133 provided in parallel to the aligning reference 3131 with the aligning marks 3133 being symmetrically arranged on both sides of the aligning reference 3131. Nevertheless, the thin film transistor substrate used here is the same as that in the first embodiment. The aligning reference 3131 is a strip-shaped metallic layer for example.

The aligning marks 3133 are strip-shaped metallic layers on surface and parallel to the edge of the thin film transistor substrate. Also, the aligning marks 3133 are spaced apart a same distance, which is in the range from 0.1 to 100 µm. That is, in the illustrated embodiment, the distance between any two adjacent aligning marks 3133 is equal because all aligning marks 3133 are part of the same unit scale. In an alternative embodiment, respective of the aligning marks 3133 can belong to two or more different unit scales.

In the process of assembling the thin film transistor substrate, the aligning marks 3133 are taken as references for applying the frame sealant and thereby for controlling the applying amount and rate of the frame sealant, so that the line width of the frame sealant and the distance between the substrates can be desirably determined.

Figure 6:
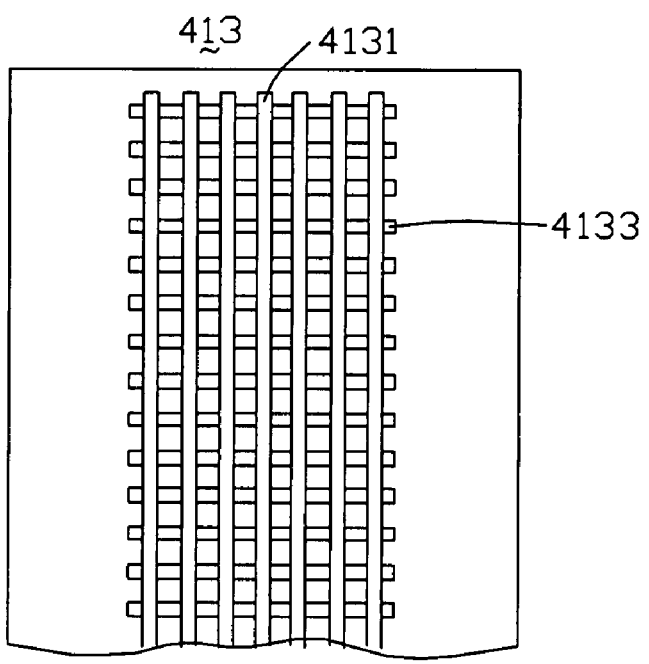
FIG. 6 is similar to FIG. 3, but showing part of one of mark regions of a thin film transistor substrate of a liquid crystal display panel according to a third embodiment of the present invention.

Referring to FIG. 6, a plan view shows the mark regions 413 according to a third embodiment of the invention, which includes a plurality of parallel aligning references 4131 and a plurality of parallel aligning marks 4133 each provided perpendicular to each of the aligning references 4131. Nevertheless, the thin film transistor substrate used here is the same as that in the first embodiment. The aligning references 4131 each is a strip-shaped metallic layer.

The aligning references 4131 are spaced apart a same distance, which is in the range from 0.1 to 100 µm. The aligning marks 4133 are spaced apart a same distance, which is in the range from 0.1 to 100 µm. The aligning references 4131 are perpendicular to the aligning marks 4133, thereby forming a grid pattern.

In the process of assembling the corresponding thin film transistor substrate, the perpendicularly crossed aligning references 4131 and aligning references 4133 are taken as references for applying the frame sealant and therefore for controlling the applying amount and rate of the frame sealant, so that the line width of the frame sealant and the distance between the substrates can be desirably determined.

Figure 7:
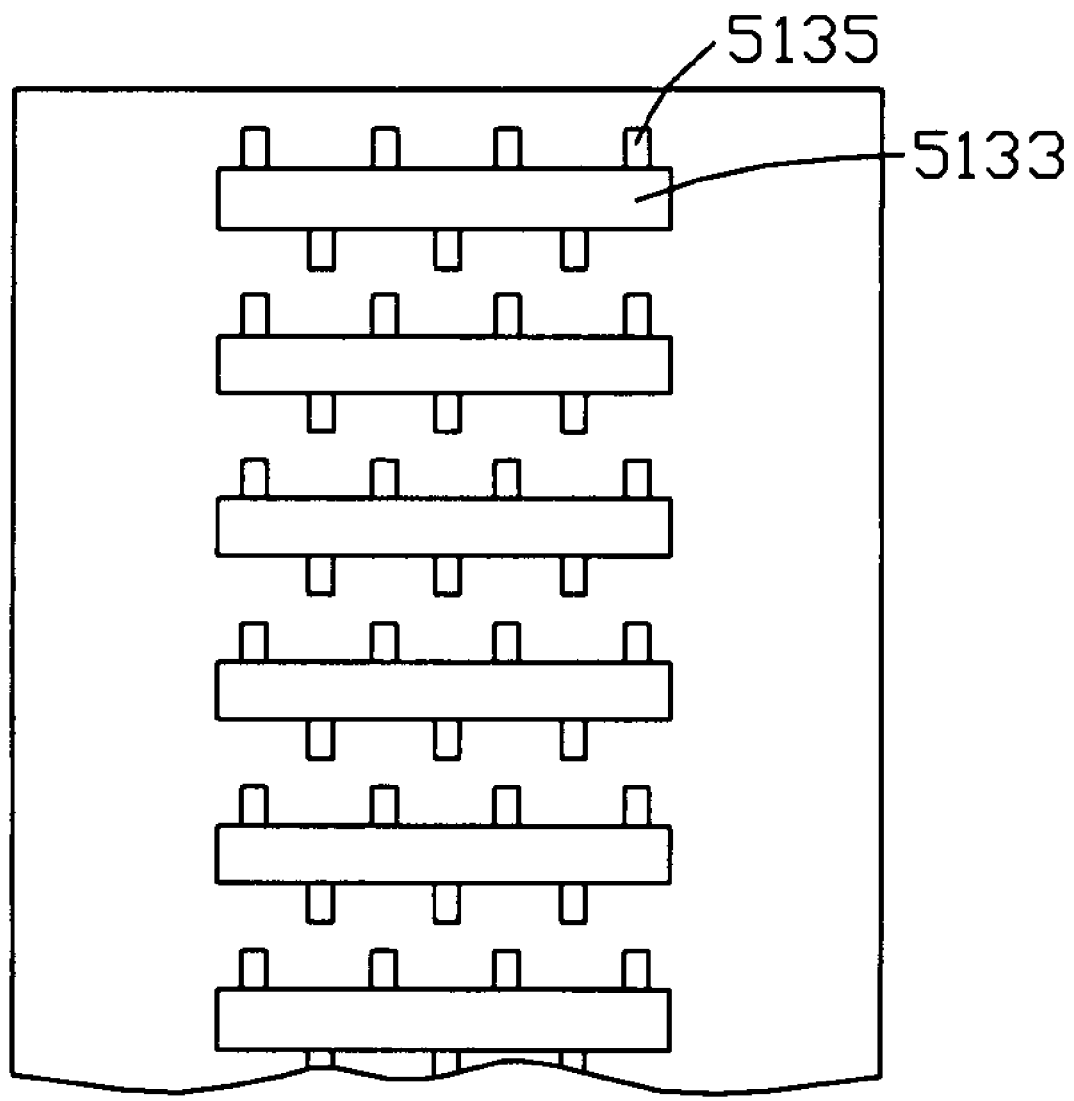
FIG. 7 is similar to FIG. 3, but showing part of one of mark regions of a thin film transistor substrate of a liquid crystal display panel according to a fourth embodiment of the present invention.
Figure 8:
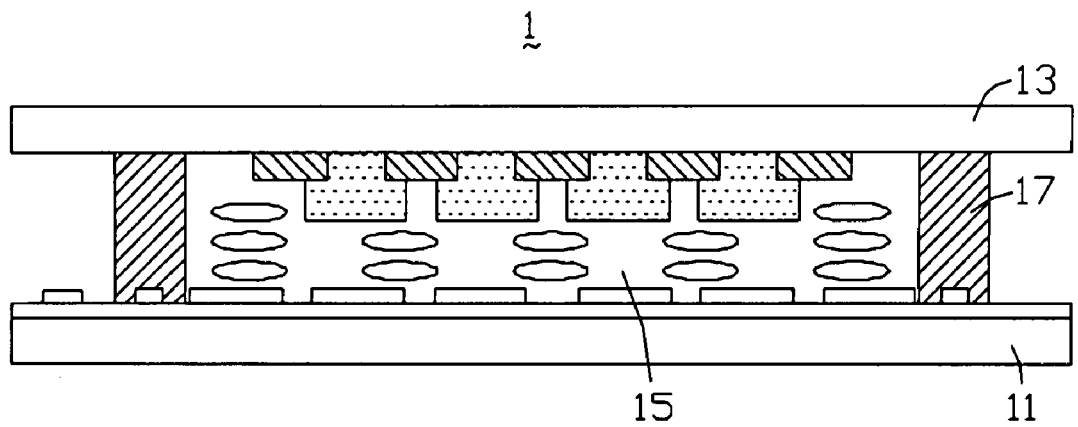
FIG. 8 is a side cross-sectional view of a conventional LCD panel.
Figure 9:
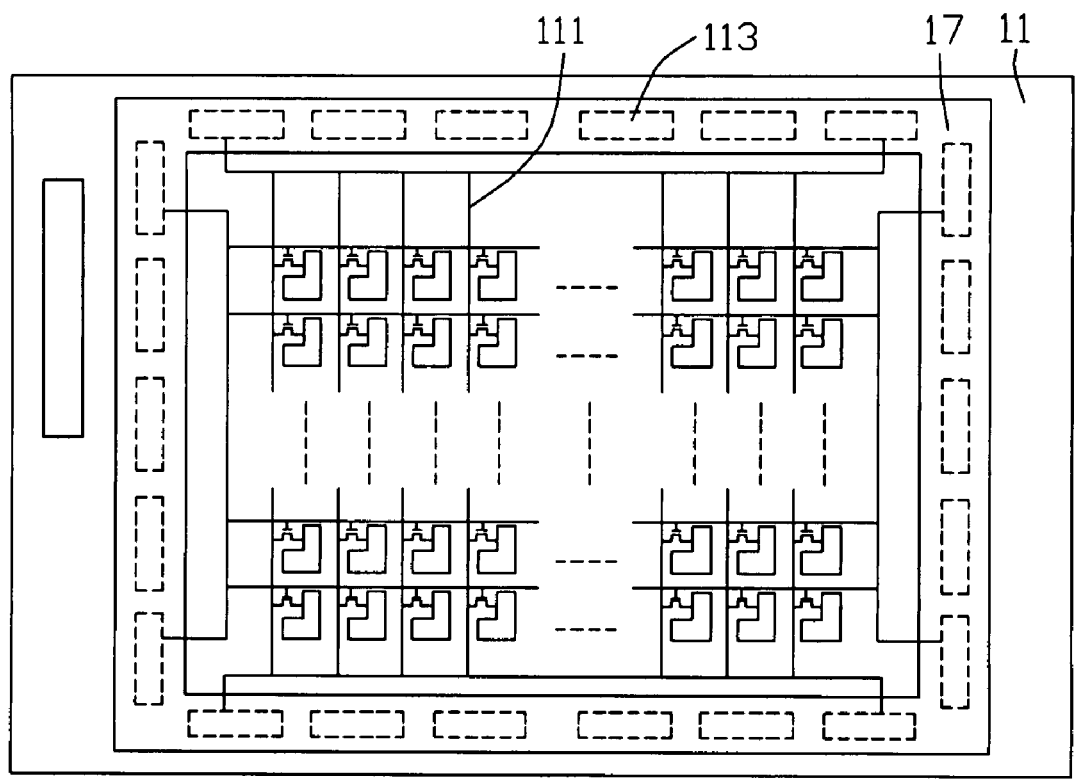
FIG. 9 is an abbreviated, top plan view of a TFT substrate of the LCD panel of FIG. 8.

Referring to FIG. 7, a plan view shows the mark regions 513 according to a fourth embodiment of the invention, which includes a plurality of parallel aligning marks 5133 each provided with a plurality of parallel aligning scales 5135. Each of the aligning scales 5135 is a strip-shaped metallic layer.

The aligning marks 5133 are spaced apart a same distance, which is in the range from 0.1 to 100 µm. Further, the aligning scales 5135 are provided on opposite sides of each aligning mark 5133 in a staggered manner and to be spaced at same distance. Nevertheless, the thin film transistor substrate used here is the same as that in the first embodiment.

In the process of assembling the thin film transistor substrate, the aligning marks 5133 and the aligning scales 5135 thereon are taken as references for applying the frame sealant and therefore for controlling the applying amount and rate of the frame sealant, so that the line width of the frame sealant and the distance between substrates can be desirably determined.

While the above description has been by way of examples and in terms of preferred embodiments, it is to be understood that the invention is not limited thereto. To the contrary, the above description is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A liquid crystal display panel comprising:
a first substrate;
a second substrate opposite to the first substrate, wherein the second substrate comprises a plurality of mark regions on a periphery thereof, and each of the mark regions comprises a plurality of aligning marks, at least one of the aligning marks provided with a plurality of parallel aligning scales along the length of the aligning mark;
a liquid crystal layer between the first substrate and the second substrate, wherein the mark regions are adjacent to the liquid crystal layer; and
a frame sealant applied to the mark regions and surrounding the liquid crystal layer.

2. The liquid crystal display panel as set forth in claim 1, wherein each of the aligning marks is a strip-shaped metallic layer.

3. The liquid crystal display panel as set forth in claim 2, wherein any two adjacent aligning marks are spaced at a distance of 0.1 to 100 µm.

4. The liquid crystal display panel as set forth in claim 1, wherein at least one of the mark regions further comprises an aligning reference provided perpendicular to each of the aligning marks.

5. The liquid crystal display panel as set forth in claim 4, wherein the aligning reference is a strip-shaped metallic layer.

6. The liquid crystal display panel as set forth in claim 4, wherein any two adjacent aligning scales are spaced at a distance of 0.1 to 100 μm.

7. The liquid crystal display panel as set forth in claim 4, wherein each of the aligning scales is a snip-shaped metallic layer.

8. The liquid crystal display panel as set forth in claim 1, wherein at least one of the mark regions further comprises an aligning reference provided parallel to the aligning marks with the aligning marks being arranged on both sides of the aligning reference.

9. The liquid crystal display panel as set forth in claim 8, wherein the aligning reference is a strip-shaped metallic layer.

10. The liquid crystal display panel as set forth in claim 1, wherein at least one of the mark regions further comprises a plurality of aligning references each provided perpendicular to the aligning marks with the aligning references being spaced apart a certain distance.

11. The liquid crystal display panel as set forth in claim 10, wherein each of the aligning references is a strip-shaped metallic layer.

* * * * *